United States Patent [19]
Taylor

[11] Patent Number: 6,053,143
[45] Date of Patent: Apr. 25, 2000

[54] METHOD OF IMPROVING COMBUSTION EFFICIENCY AND REDUCING EXHAUST EMISSIONS BY CONTROLLING OIL VOLATILITY IN INTERNAL COMBUSTION ENGINES

[75] Inventor: Gordon W. R. Taylor, Woodlawn, Canada

[73] Assignee: 709398 Ontario Ltd., Woodlawn, Canada

[21] Appl. No.: 09/084,171

[22] Filed: May 26, 1998

[51] Int. Cl.⁷ ...................................................... F01M 1/00
[52] U.S. Cl. ........................ 123/196 AB; 123/3; 123/1 A
[58] Field of Search ................................ 123/196 AB, 3, 123/575, 1 A

[56] References Cited

U.S. PATENT DOCUMENTS

| | | |
|---|---|---|
| 4,272,371 | 6/1981 | Moses et al. . |
| 4,349,438 | 9/1982 | Sims . |
| 4,458,642 | 7/1984 | Okubo et al. ................. 123/196 AB |
| 4,943,352 | 7/1990 | Lefebvre et al. . |
| 4,971,704 | 11/1990 | Johnson et al. . |
| 5,242,034 | 9/1993 | DePaul . |
| 5,322,596 | 6/1994 | Arntz . |
| 5,630,912 | 5/1997 | LeFebvre . |
| 5,630,956 | 5/1997 | Lynch . |
| 5,707,515 | 1/1998 | DePaul . |

FOREIGN PATENT DOCUMENTS

WO96/25996  8/1996  WIPO .

*Primary Examiner*—John Kwon
*Attorney, Agent, or Firm*—Trevor C. Klotz

[57] ABSTRACT

A method of improving the operating efficiency and reducing certain exhaust emissions in an internal combustion engine is disclosed. By continuously subjecting a portion of recycling engine lubricating oil to heat treatment in the range from 170° C. to 260° C. and preferably the range from 180° C. to 240° C. in a volatilization chamber or the like, an improvement in the fuel consumption as well as a reduction in the total hydrocarbons, carbon dioxide and particulates can be achieved.

3 Claims, 4 Drawing Sheets

METHOD OF IMPROVING COMBUSTION EFFICIENCY AND REDUCING EXHAUST EMISSIONS BY CONTROLLING OIL VOLATILITY IN INTERNAL COMBUSTION ENGINES

This invention relates to a method for improving combustion efficiency and reducing exhaust emissions, primarily total hydrocarbons, carbon monoxide and particulates in internal combustion engines by continuously controlling the volatility of lubrication oil which is recycled through the engine during engine operation.

BACKGROUND OF INVENTION

Oil filters, recyclers, refiners or reclamation devices are used as a component part of internal combustion engines to filter or otherwise alter in some way an engine's lubricating oil which undergoes constant recycling through the engine.

Typical of such devices which filter and/or subject an engine's recycling engine oil to heat treatment in an evaporation chamber so as to separate liquid contaminates therefrom, are those disclosed in numerous prior patents such as U.S. Pat. No. 4,272,371 issued Jun. 1, 1981—Moses et al, U.S. Pat. No. 4,349,438 issued Sep. 14, 1982—Sims, U.S. Pat. No. 4,458,642 issued Jul. 10, 1984—Okubo et al, U.S. Pat. No. 4,943,352 issued Jul. 24, 1990—Lefebvre et al, U.S. Pat. No. 4,971,704 issued Nov. 20, 1990—Johnson et al, U.S. Pat. No. 5,630,956 issued May 20, 1997—Lynch, U.S. Pat. No. 5,630,912 issued Jan. 13, 1998—DePaul, U.S. Pat. No. 5,322,596 issued Jun. 21, 1994—Arntz, and U.S. Pat. No. 5,242,034 issued Sep. 7, 1993—DePaul.

A further representative oil recycler is disclosed which serves the twofold purpose of filtering the lubricating oil as it recycles through the engine so as to remove particles therefrom and heating a portion of the lubricating oil being recycled in a heating chamber so as to evaporate liquid contaminates from the oil which passes through the chamber is disclosed in PCT Application PCT/GB96/00424 published under No. WO96/25996 on Aug. 26, 1996—Assali. It is the heating of oil in a chamber such as that disclosed in the Assali published application and other known prior art devices which are designed to heat and thereby evaporate liquid contaminates from recycling engine oil to which the process of the invention disclosed herein has particular application.

Assali, as well as others, have invariably employed a heating chamber for treating a portion of the recycling engine oil at a temperature sufficient to evaporate liquid impurities carried by the oil being recycled such as water or fuel. Assali discloses a heat chamber which is electronically controlled at a temperature from 115° C. to 135° C. In U.S. Pat. No. 5,707,515 (supra.), DePaul discloses an operating temperature for the heating or distillation chamber in his lubricating oil reconditioning system of about 190° F. (88° C.). U.S. Pat. No. 4,943,352 (supra.), Lefebvre indicates that the evaporation chamber operates at a temperature sufficient to evaporize fuel and water from the oil and noting water will evaporate at less than 212° F. (100° C.) and fuel at less than its flashpoint.

It is apparent from the foregoing that heating chambers which can variously be described as reclamation or refining devices, recycling devices, volatilization chambers or distillation stills have, hitherto, been designed to treat oil which is recycled through an internal combustion engine at a temperature which approximates the boiling point of the liquid contaminates, such as water, glycol or fuel carried by the recycled oil, and which temperature, based on the published literature, need only operate at an upper temperature limit of 135° C., with reference in this regard being had to Assali (supra.).

SUMMARY OF INVENTION

By measuring the exhaust emissions of an internal combustion engine which employs a heating or volatilization chamber for treating recycled oil at accepted operating temperatures appearing in the published literature, no noticeable improvement in the efficiency of the engine or in the reduction of unwanted exhaust emissions has been noted over engines operating without oil heaters of this nature. However, it is known that evaporation of lubricating oil does occur in the combustion chamber and contributes to oil consumption. It is also recognized that as oil ages and is contaminated with light hydrocarbon fractions from fuel blow-by, particulate emissions increases.

Surprisingly, I have found through exhaust emission measurement, that by operating the heating or volatilization chamber in devices of the foregoing description at significantly elevated temperatures in excess of that traditionally employed to evaporate liquid contaminates to thereby additionally remove certain portions of the light fractions of the recycling engine oil, the engine efficiency is improved and the percentage of total hydrocarbons, carbon monoxide and particulates can be reduced.

The sensitivity of exhaust emissions to the temperature at which the recycling oil is heated has been found to be critical, with the best emission performance parameters being obtained when heating the recycling oil to a temperature in a range from 170–260° C. and preferably in the range of 180° C. to 240° C. By heating the oil within this range, all water and fuel contaminates, as before, are evaporated, together with hydrocarbons and other compounds that have a boiling point below the set heater temperature. The elimination of low boiling point combustibles from the recycling oil results in a reduction in the evaporation of the lubricating oil when exposed to engine cylinder temperature and pressure conditions.

The combustion process changes that results when employing the process of my invention is believed to be that the oil film from the treated oil which is on the cylinder wall in a thin film form, requires a higher temperature and time to evaporate into the cylinder gasses. This reduction is most important in the upper half of the engine's expansion stroke (in regions in which there is still flame propagation and combustion occurring). This, in turn, reduces the amount and nature of the unburned hydrocarbons and particulates (soot), and increases overall combustion temperature and efficiency.

In practicing the process of my invention, a portion of the recycled lubricating oil in the engine is continuously heated in a volatilization chamber as is known in the art, but is subjected to heat exposure in the chamber such that at least the surface or skin temperature of the oil attains a temperature in a range from 170° C. to 260° C. and preferably 180° C. to 240° C. By continuously heating the recycling engine oil within this temperature range, the light fractions of the oil is decreased and maintained at the predetermined distillation temperature which the recycled lubricating oil undergoes within the heating chamber. The high heating and distillation of the oil as it repeatedly passes through the heating chamber effectively changes the lubricating oil's distillation or boiling point curve (the percentage of oil that is evaporated at various temperatures) as measured by various standard industry tests such as ASTM D2887—Boiling Range Distribution of Petroleum Fractions by Gas Chromatraphy, or ASTM D93 —Cleveland Open Cup Measurement of Flash and Fire Point. In other words, the recycled oil which has continuously been subjected to high temperature distillation treatment effectively shifts the distillation curve to one having a higher flashpoint than the initial flashpoint of untreated lubricating oil.

Based on the above, the novel process of my invention, which effectively controls the volatility of recycling lubrication oil in an internal combustion engine so as to improve its combustion efficiency and also reduce its total hydrocarbons, carbon monoxides and particulates in the exhaust emission comprises the step of continuously heating a portion of said recycling lubrication oil in a volatilization chamber to a temperature which is in single measurement terms, in excess of the normal flashpoint temperature of the lubricating oil. The flashpoint temperature of most lubricating oils used in internal combustion engines, is generally found in the range of from 160° C. to 200° C. when measured at atmospheric pressure.

Advantageously, by employing known oil heating devices, the volatiles which are liberated during heating can be vented directly or through the Positive Ventilation Control valve into an intake manifold of the engine.

DETAILED DESCRIPTION

Figure 1:
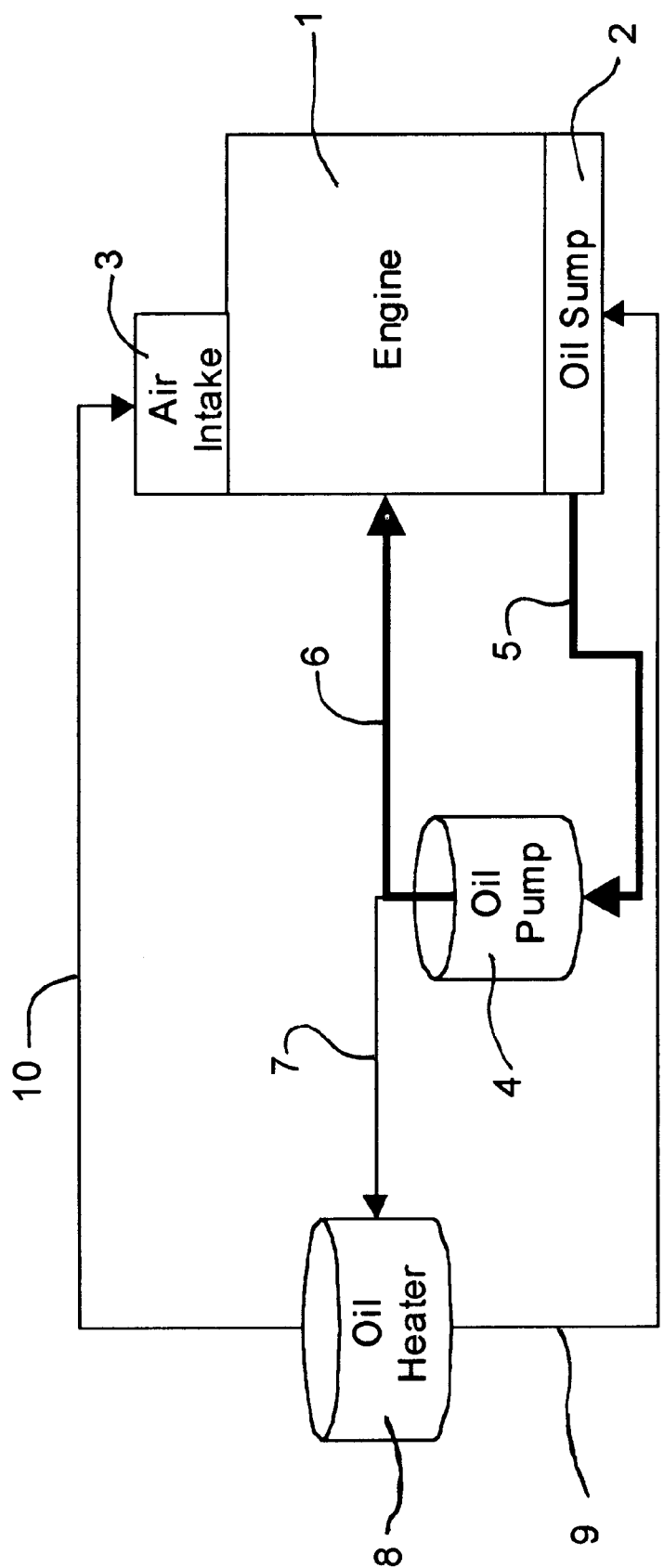
FIG. 1 is a flow diagram which illustrates the feed flow and return flow of recycled oil through a heating chamber operatively connected to an internal combustion engine.

FIG. 1 schematically illustrates the flow of recycling engine lubricating oil in engine 1, oil sump 2 and air intake or manifold 3. Oil is drawn from sump 2 by oil pump 4 through line 5 and reintroduced into the engine under pressure via feed supply line 6 and which is again collected in sump 2. This circuit for recycling engine oil normally has included in it provision for an oil filter (not shown). However, and as illustrated, a portion of recycling oil can be drawn off line 6 and fed through supply line 7 to oil heater 8 which can be of any conventional form of known construction but which is operated at much higher than normal oil heating temperature namely in a temperature range from 170° C. to 260° C. Heat treated oil is returned to the sump 2 via return line 9 while the volatiles from the oil undergoing heat treatment are fed into the air intake 3 of engine 1 through vent line 10.

In order to determine if the volatility of recycling engine lubricating oil had an effect on the combustion efficiency and exhaust emissions of an internal combustion engine, two test series were carried out at Environment Canada's Emission Measurement and Research Laboratory located in Ottawa, Ontario, Canada. For this purpose, a Lister-Petters (1.3 L) direct injection single cylinder diesel engine having no load (mass inertia only) was employed in both series of tests.

To obtain engine performance analytical data, the heat treatment of the oil was carried out on a batch basis, with the lubricating oil being drained from the engine prior to undergoing heat treatment, and following which it was reintroduced into the engine for further testing and analysis. While testing could have been performed when the engine was running and while a portion of the recycling oil of the engine was undergoing heat treatment, due to, inter alia, the time delay in ensuring all of the recycled oil had undergone heat treatment at the same temperature, obtaining engine performance data using this procedure was not pursued, as it was regarded as being less reliable for engine performance comparison purposes.

The external heating element or chamber for the oil used in all of the tests comprised a plate having a 5 mm deep channel section therealong for the passage of oil therethrough, and which along a substantial length of the channel, was covered over by a thermostatically controlled heating element. Oil was permitted to pass through the channel in thin film form by gravity feed of approximately 2 cl per second in close proximity to the heating element.

The temperature of the oil in the heating element or chamber was monitored directly from the temperature of the heating element itself employing for this purpose a standard laboratory "K" type thermocouple and volt meter.

Before commencing the test series, the engine was charged with fresh and untreated lubricating oil (SAE 10W30) and run for 20 minutes at a maximum of 1,600 rpm in order to ensure that it was fully warmed up. The fuel consumption and exhaust emissions of this engine while running at normal operating temperature was then monitored and analyzed using the test methods set forth in *United States Code of Federal Regulations*, Schedule 40, Part 86 so as to obtain benchmark average readings for the engine's hydrocarbon, carbon monoxide, carbon dioxide, nitrogen oxides and particulates in its exhaust emissions and its fuel consumption.

The untreated engine oil was then drained from the engine and all of it passed through the above-described heating element or chamber, the heating temperature of which was preselected and maintained constant. The recovered heat treated oil was then reintroduced into the engine. The engine was then run continuously for five minutes and during that time, was repeatedly cycled between a wide open throttle (WOT) for five seconds and a ten second idle. The fuel consumption and exhaust emissions were monitored and analyzed using the same test procedures as used to obtain the benchmark average readings for the same oil that had not been subjected to heat treatment. The oil used in the first test was then drained from the engine and again passed through the heating element so as to again subject the oil to heat treatment at the same or higher preselected heating temperature.

As before, this oil which was subjected to a second heat treatment was recovered and reintroduced into the engine in order to undergo the same cycling exercise and engine analysis. This procedure of heat treating the same lubricating oil and monitoring and analyzing fuel consumption and exhaust emissions was repeated in order to obtain analytical data on the performance of the engine, with the only variable being the treatment temperature to which the engine oil was subjected, and which heat treatment temperatures ranged from 170° C. to 260° C.

During each sequence test, a sample of the exhaust was collected using a constant volume sampling system. The sampled volume was analyzed at the end of each five minute sequence for hydrocarbons, carbon monoxide, carbon dioxide, nitrogen oxides and particulates. In addition, fuel consumption was calculated using the carbon balance method as set forth in the *United States Code of Federal Regulations*, Schedule 40, Part 86.

Table 1 sets forth the test results obtained during two series of tests conducted on Dec. 19, 1997 and Dec. 23, 1997.

TABLE 1

| | | Emission Data (g/min) | | | | | | | | | | | |
|---|---|---|---|---|---|---|---|---|---|---|---|---|---|
| Test Cycle | T(° C.) | COC | THC | THC % | CO | CO % | $NO_x$ | $NO_x$ % | $CO_2$ | $CO_2$ % | PM | PM % | mL/Min | mL/Min % |
| Test Date Dec. 19 | | | | | | | | | | | | | | |
| 5/10s | 170 | 214 | 0.24 | 2% | 1.34 | 9% | 0.18 | −3% | 15.94 | 5% | 0.19 | 9% | 6.991 | 4.9 |
| 5/10s | 170 | 214 | 0.23 | −2% | 1.13 | −9% | 0.19 | 3% | 14.52 | −5% | 0.16 | −9% | 6.332 | −4.9 |
| 5/10s | 180 | 214 | 0.21 | −11% | 1.35 | 9% | 0.19 | 3% | 15.89 | 4% | 0.15 | −14% | 6.950 | 4.3 |
| 5/10s | 180 | 214 | 0.24 | 2% | 1.22 | −1% | 0.19 | 3% | 14.6 | −4% | 0.16 | −9% | 6.429 | −3.5 |
| 5/10s | 200 | 214 | 0.17 | −20% | 0.37 | −70% | 0.23 | 24% | 15.95 | 5% | 0.08 | −54% | 6.347 | −4.7 |
| 5/10s | 200 | 214 | 0.2 | −11% | 0.39 | −68% | 0.22 | 19% | 18.51 | 22% | 0.11 | −37% | 7.348 | 10.3 |
| 5/10s | 220 | 216 | 0.21 | −8% | 0.39 | −68% | 0.22 | 19% | 15.87 | 4% | 0.14 | −20% | 6.349 | −4.7 |
| 5/10s | 220 | 216 | 0.27 | 11% | 0.5 | −60% | 0.21 | 14% | 15.9 | 4% | 0.15 | −14% | 6.524 | −2.1 |
| 5/10s | 240 | 218 | 0.21 | −8% | 0.38 | −69% | 0.2 | 8% | 14.54 | −5% | 0.1 | −43% | 5.879 | −11.7 |
| 5/10s | 240 | 218 | 0.22 | −5% | 0.39 | −68% | 0.2 | 8% | 14.54 | −5% | 0.11 | −37% | 5.892 | −11.5 |
| Test Date Dec. 23 | | | | | | | | | | | | | | |
| 5/10s | 240 | 218 | 0.21 | −8% | 0.38 | −69% | 0.2 | 8% | 16.16 | 6% | 0.15 | −14% | 7.046 | 5.8 |
| 5/10s | 260 | 218 | 0.22 | −5% | 0.47 | −62% | 0.22 | 19% | 17.49 | 15% | 0.16 | −9% | 7.040 | 5.7 |

Table 1 Notes
COC: Cleveland Open Cup test for Flashpoint (° C.)
THC: Total Hydrocarbons
% HC (etc) percentage change from the average reading of the untreated oil
$NO_x$: Oxides of Nitrogen
T: Heating temperature (° C.)
CO: Carbon Monoxide
PM: Particulates
mL: fuel volume As seen from Table 1 and FIGS. 2 and 3, relative to a baseline reading for hydrocarbons, carbon monoxide and particulates as determined from the average reading of tests using oil not subjected to heat treatment, there is a significant drop in the Co emission rate which is in the −60% range at heating temperatures in excess of 180° C. This reduction is an indicator that the combustion efficiency of the engine has increased, with this efficiency gain reflected in the mL/Min fuel consumption columns.

It will also be observed from Table 1 that there appears to be corresponding reduction in total particulate mass emissions as the CO in the emissions drops.

After each test sequence, samples of the lubricating oil were taken and the flashpoint of the oil determined using ASTM D93 by an independent oil analysis company. The data is plotted in FIG. 4 and indicates that the flashpoint of the recycling oil has changed by the oil heat treatment.

Figure 2:
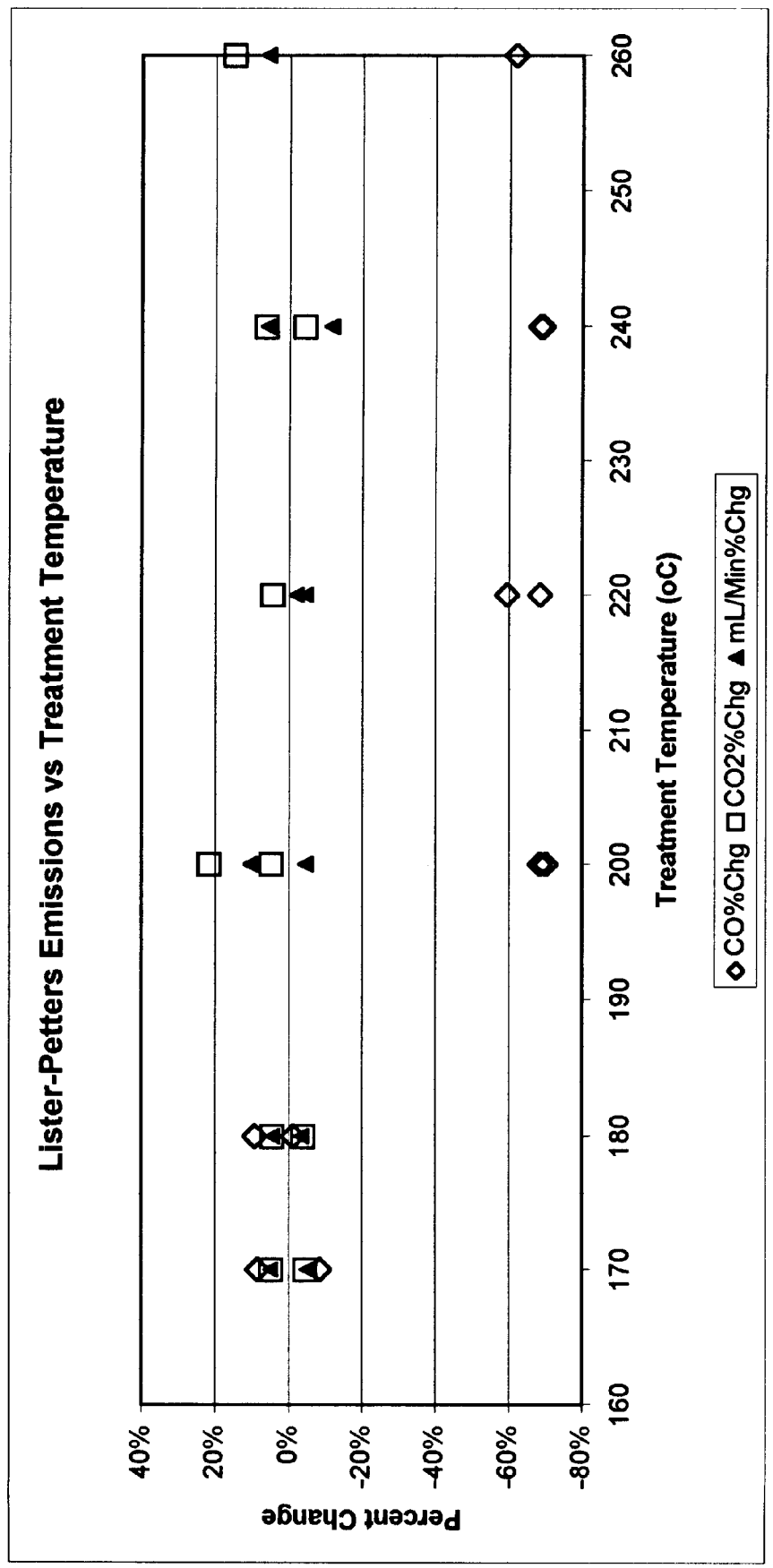
FIG. 2 is a graph comparing the percentage change of total hydrocarbons (THC), nitrogen oxides ($NO_x$) and particulates (PM) at different heating temperatures of the recycling engine lubricating oil.
Figure 3:
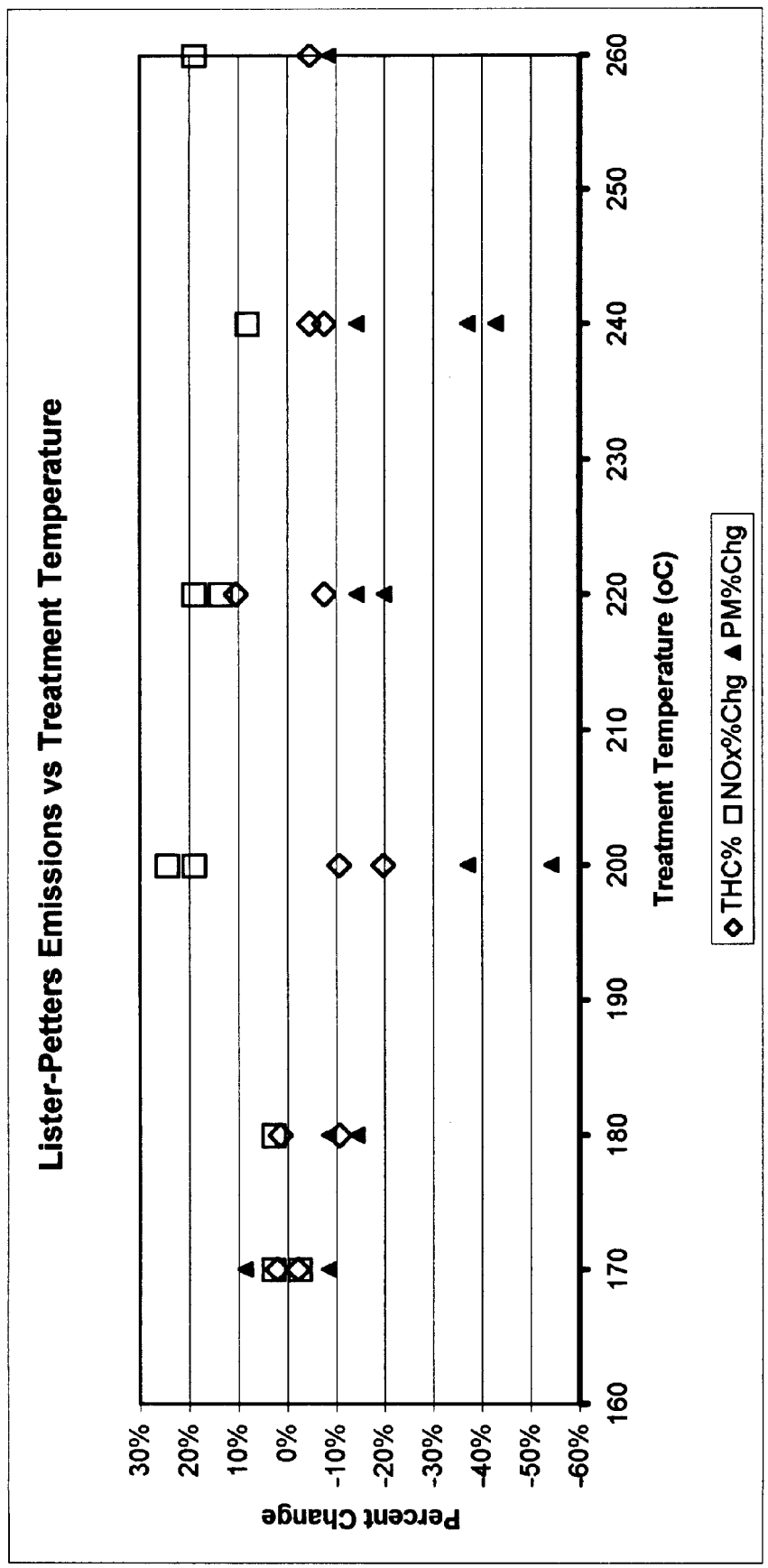
FIG. 3 is a similar graph comparing the percentage change of carbon monoxide (CO) and carbon dioxide ($CO_2$) in the exhaust emissions and the fuel consumption expressed in millilitres per minute (mL/Min) at different operating temperatures of the heat chamber.
Figure 4:
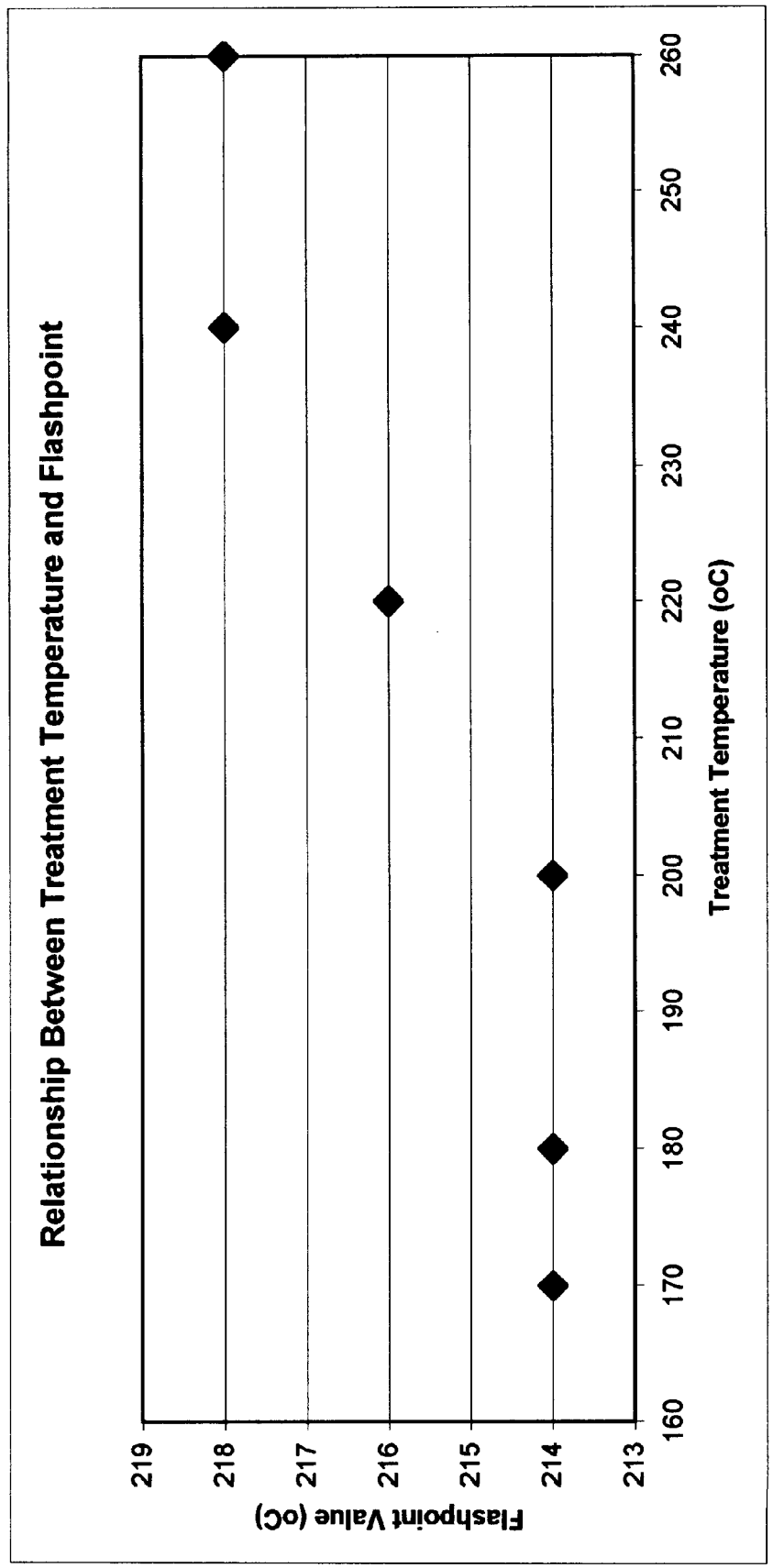
FIG. 4 is a graph illustrating the relationship between the heating chamber treatment temperature and the flashpoint measurement of the oil subjected to heat treatment.

Based on the analytical data obtained and as set forth in Table 1 and FIGS. 2, 3 and 4, it is apparent that the engine efficiency and improved exhaust gas emissions is a direct result of heat treating the recycling lubrication oil at significantly elevated temperatures.

I claim:

1. A process for controlling the volatility of recycling lubrication oil in an internal combustion engine so as to improve the combustion efficiency of said engine while concurrently reducing the total hydrocarbons, carbon monoxide and particulates in the exhaust emissions from said engine, said process comprising continuously heating a portion of said recycling lubricating oil in a volatilization chamber at a temperature from 170° C. to 260° C. so as to separate the light volatile fractions in the recycling oil from the remainder of the recycling oil.

2. The process as claimed in claim 1, wherein the light volatile fractions separated in the volatilization chamber are vented to an intake manifold of said engine.

3. The process as claimed in claim 1 or 2, wherein said recycling oil is heated in said chamber at a temperature from 180° C. to 240° C.

* * * * *